United States Patent Office 3,048,627
Patented Aug. 7, 1962

3,048,627
DECOLORIZATION OF AMINO ACID MIXTURES OBTAINED FROM BLOOD PROTEIN HYDROLYSIS
Havard L. Keil, Clarendon Hills, and Edward F. Cavanaugh, Wilmette, Ill., assignors, by mesne assignments, to Armour and Company, Chicago, Ill., a corporation of Delaware
No Drawing. Filed Dec. 3, 1957, Ser. No. 700,272
4 Claims. (Cl. 260—534)

This invention relates to a process for preparing amino acids from blood protein hydrolysates. The invention is particularly related to a process for decolorizing mixtures of amino acids obtained by the sulfuric acid hydrolysis of blood proteins.

The fact that blood protein may be readily hydrolyzed to yield amino acids has been a matter of common knowledge for many years. For various reasons, however, these important acids have not been commercially prepared by such means. Instead, it has been found more expedient to manufacture them directly by organic synthesis techniques.

Although amino acids have been prepared synthetically for a considerable length of time, they have not been produced economically enough to warrant their use in further industrial processing. As a result, amino acids have not been as extensively used as might be expected. Nevertheless, the chemical versatility of a single substance possessing both a free amino ($NH_2$) and a free carboxyl (COOH) group in the same molecule has not gone unrecognized. Within the past few decades, uses for such acids have been established in widely separated fields of endeavor.

Proline has been used as a dye intermediate in the photographic field; glycine is employed as a reducing agent and as a catalyst; the sodium salt of glutamic acid has been unrivaled as a synthetic meat flavor; alanine hydrochloride has long been used in the pharmaceutical industry. In the medicinal field, acids like leucine, isoleucine, d-lysine, l-cystine, phenyl alanine, l-histidine and l-tryptophane, which are known to be "essential" to the growth and development of all animal life, have been extensively prescribed; derivatives of amino acids have found use as detergents, wetting agents, disinfectants, textile assistants, moth-proofers and egg preservatives. Accordingly, a low cost source of uncontaminated amino acids which contain all the acids of native proteins is desired by a variety of industries.

In order to hydrolyze blood proteins to amino acids, drastic chemical or biochemical action is necessary. Usually such breakdown is accomplish by hydrolyzing native protein with concentrated sulfuric or hydrochloric acid. Dilute inorganic acids are also effective. Organic acids like formic and acetic acid have also been used, but they require higher pressure and temperature to produce amino acids.

Strong alkaline solutions will also yield amino acids from native poteins. This type of hydrolysis requires continued cooking and the amino acids thus produced are partially racemized. Because of the undesirable products thus obtained, alkaline hydrolysis is not extensively employed.

Mere hydrolysis of blood proteins to amino acids, however, does not solve the problem of preparing a pure mixture of such acids. Once the proteins are cleaved and the amino acids are produced in the hydrolysate solution, the question of how to separate them from the hydrolyzing acid becomes paramount. The purification of blood protein hydrolysates is also complicated by the fact that acid hydrolyzed blood contains colored products formed of decomposed amino acids, carbohydrates, and various prosthetic groups which tend to form complexes in the hydrolysate solution. In the event that one desires to precipitate such amino acids from the solution by isoelectric methods, the complexes derived from degradation products tends to inhibit the isoelectric precipitation. Accordingly, it is an object of the present invention to provide a more efficient means for removing such complexes and colorizing materials from the hydrolysate solution.

It has been the practice to boil such hydrolysate solutions with activated charcoal in an acid solution. Following this procedure the solution is then filtered and the colored impurities are removed by filtration since they are absorbed on the carbon. In the method of this invention, however, such colored impurities are removed without the necessity for the step of boiling the hydrolysate with activated carbon. We have found it possible to precipitate colored impurities from blood hydrolysate solutions by the simple step of adding gaseous ammonia to the solution to raise the pH of the blood hydrolysate solution to within the range of from 4 to 6.5. Although we have found the pH range of 4 to 6.5 to be effective in color removal, the purest amino acids are obtained when ammonia is used to bring the pH up to approximately 5.7. Following this step the colored impurities precipitate together with some ammonium sulfate. We have also found it desirable after the separation of the precipitate to resuspend the precipitate in water and to again filter the solids from the suspended filtrate. By the means of these steps some amino acids occluded in the first precipitate are freed from the solid materials and recovered in the supernatant. The supernatant solutions from each filtration are then combined and evaporated to dryness. Upon analysis the product is found to contain a mixture of ammonium sulfate and pure amino acids.

The invention may be illustrated by the following specific examples:

*Example I*

To 5 pounds of commercial grade dried hemoglobin was added 15 pounds of water. Eeight pounds of 95–96% sulfuric acid was slowly stirred in and the mixture heated to 130° C. in an open kettle. It was held at 130° C. for 3 hours with the periodic addition of water to compensate for water lost in steam.

Ten pounds of cold water was then added and ammonia gas bubbled in until the pH rose to 5.7. The product was filtered, without the need for charcoal decolorization or filter aid, through a large Büchner funnel by suction. The precipitated solids in the Büchner funnel were removed and resuspended in 10 pounds of water and filtered as before.

The combined filtrates were dried in vacuo to give around 13 pounds of a mixture of amino acids together with ammonium sulfate. Upon separation, there was rehovered 26% of amino acids and 74% of ammonium slufate (3.4 pounds amino acids and 9.6 pounds ammonium sulfate).

The over-all yield of amino acids recovered after purification was found to represent around 75% of the dry weight of the hemoglobin protein before hydrolysis.

*Example II*

To 14 pounds of commercial grade liquid hemoglobin (35% solids) was added 15 pounds of water. Eight pounds of 96% sulfuric acid was slowly stirred in and the mixture was boiled until the temperature rose to about 130° C. It was thereafter held at 130° C. for 3 hours by the periodic addition of make-up water lost in steam.

Ten pounds of cold water was then added and ammonia gas bubbled in until the pH rose to 4.5. The product was then filtered and the solids were resuspended in ten pounds of water and filtered as before. The combined filtrates were then dried in vacuo and upon analysis there was recovered a light amber-colored, non-hygroscopic mixture of amino acids and ammonium sulfate.

*Example III*

Whole blood proteins were converted to amino acids by boiling from 2 to 3 hours in a solution composed of 1.4 gms. of 96% sulfuric acid and 1.0 gm. of water per gram of dry blood protein. To the resulting liquid was added water for cooling and diluting after which gaseous ammonia was bubbled in until the pH rose to 5.7. The colored impurities were then removed by filtration. The filtrate was cooled and gaseous ammonia bubbled in again until the pH rose to 9.0. The most insoluble amino acids were then precipitated and removed by filtration to recover about 28% of the total weight of the dry protein; the amino acids recovered in this step are principally leucine and tyrosine. The filtrate was then evaporated to recover the more soluble amino acids which amounted to approximately 32% of the protein hydrolyzed. The total yield is about 60% based on the dry weight of the whole blood. The ammonium sulfate can be recovered from each precipitate and used in fertilizer compositions or for other purposes.

*Example IV*

About 8 pounds of 95% sulfuric acid was slowly stirred into an aqueous solution of 14 pounds of commercial grade liquid hemoglobin. The mixture was then boiled until the temperature rose to about 120° C. The solution was maintained at a temperature of from about 120 to 130° C. for 3 hours during which time water was added to the solution to make up for water lost as steam.

Following the hydrolysis, cold water was added to the solution and ammonia gas was bubbled into the solution until the pH rose to about 6.2. The solution was then filtered and the precipitate resuspended in water and refiltered. The filtrates were then combined and dried under a vacuum. The resulting dry mixture of amino acids and ammonium sulfate had a light amber color and was nonhydroscopic.

While in the foregoing specification we have set forth specific steps in detail for the purpose of illustration, it will be understood that details of the process may be varied widely by those skilled in the art without departing from the spirit and scope of our invention.

We claim:

1. The method of decolorizing mixed amino acids formed in a hydrolysate solution consisting of blood and sulfuric acid comprising adding only sufficient ammonia to said solution to raise the pH thereof to within the pH range of from about 4 to about 6.5, separating the precipitate and the supernatant solution, said precipitate containing undesirable colored materials and ammonium sulfate, drying the supernatant obtained to obtain a decolorized mixture of amino acids and ammonium sulfate.

2. The method of decolorizing mixed amino acids formed in a hydrolystate solution consisting of blood and sulfuric acid comprising adding only sufficient ammonia to said solution to raise the pH thereof to within the pH range of from about 4 to about 6.5, separating the precipitate and the supernatant solution, said precipitate containing undesirable colored materials and ammonium sulfate, adding water to said precipitate to resuspend said precipitate in water, separating the supernatant from the resuspended precipitate, drying the supernatant obtained from each separation to obtain a decolorized mixture of amino acids and ammonium sulfate.

3. The method of decolorizing mixtures of amino acids formed in a hydrolysate solution consisting of blood and sulfuric acid comprising adding only sufficient ammonia to said solution to raise the pH thereof to about 5.7, separating the precipitate and the supernatant solution, said precipitate containing undesirable colored materials and ammonium sulfate, adding water to said precipitate to resuspend said precipitate in water, separating the supernatant from the resuspended precipitate, drying the supernatant obtained from each separation to obtain a decolorized mixture of amino acids and ammonium sulfate.

4. The method of decolorizing mixtures of amino acids formed in a hydrolysate solution consisting of blood and sulfuric acid comprising adding only sufficient ammonia to said solution to raise the pH thereof to about 5.7, separating the precipitate and the supernatant solution, said precipitate containing undesirable colored materials and ammonium sulfate, drying the supernatant obtained to obtain a decolorized mixture of amino acids and ammonium sulfate.

References Cited in the file of this patent

UNITED STATES PATENTS

| | | |
|---|---|---|
| 2,071,282 | Gluud et al. | Feb. 16, 1937 |

FOREIGN PATENTS

| | | |
|---|---|---|
| 139,236 | Australia | Oct. 31, 1950 |

OTHER REFERENCES

Clark et al.: Encyclopedia of Chemistry, 1957, pp. 72–73. (Copy in Lib.)